(No Model.)
T. I. RANKIN.
STOVE.
No. 539,643. Patented May 21, 1895.
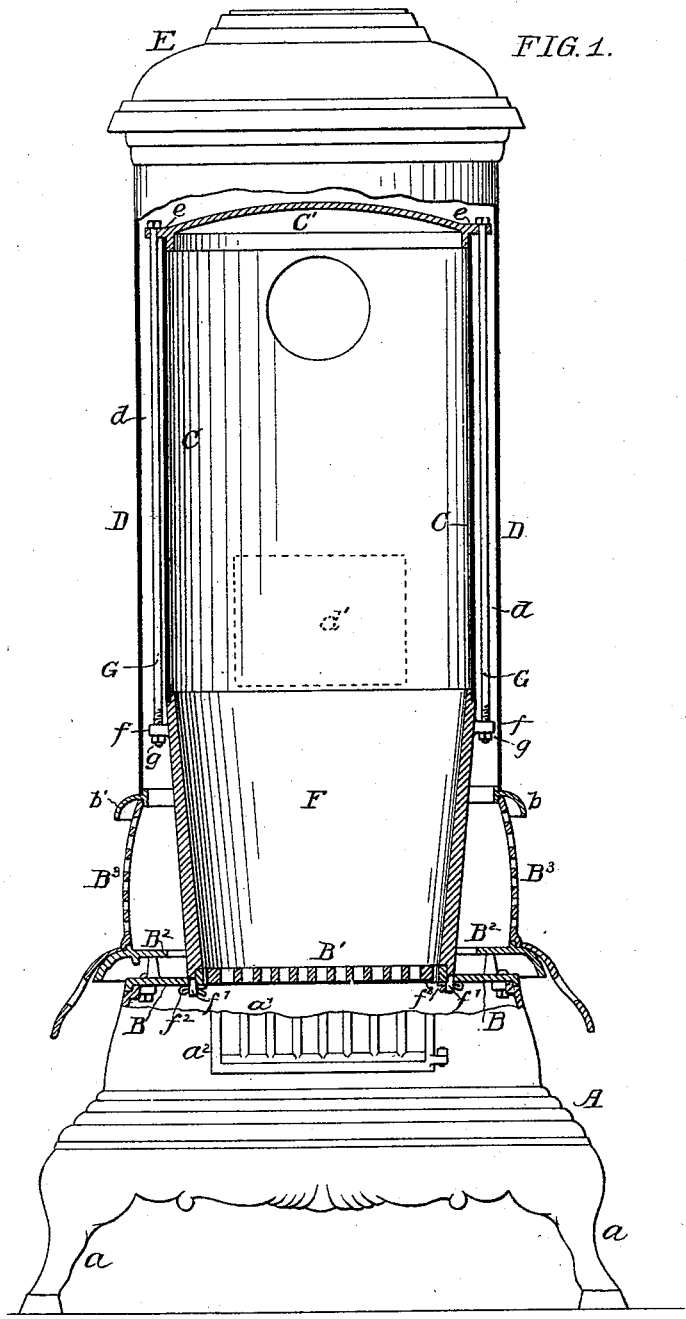
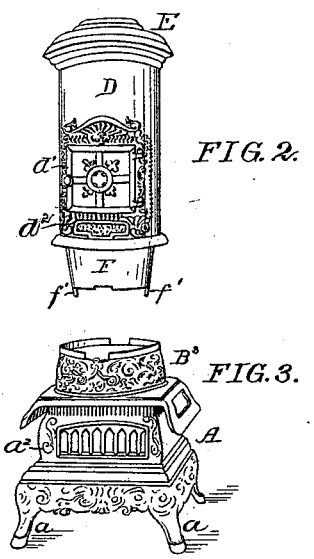
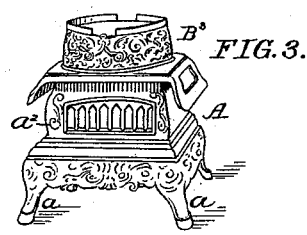
Witnesses:
F. D. Goodwin
Murray C. Boyer
Inventor:
Thomas I. Rankin
by his Attorneys
Howson & Howson

UNITED STATES PATENT OFFICE.

THOMAS I. RANKIN, OF PHILADELPHIA, PENNSYLVANIA, ASSIGNOR TO THE ABRAM COX STOVE COMPANY, OF SAME PLACE.

STOVE.

SPECIFICATION forming part of Letters Patent No. 539,643, dated May 21, 1895.

Application filed November 28, 1894. Serial No. 530,245. (No model.)

*To all whom it may concern:*

Be it known that I, THOMAS I. RANKIN, a citizen of the United States, residing in Philadelphia, Pennsylvania, have invented certain Improvements in Stoves, of which the following is a specification.

The object of my invention is to so construct a heating stove that the fire pot can be removed from the base with the body portion of the stove that access may be had to the interior of the base without detaching the fire pot from the body.

Referring to the accompanying drawings, Figure 1 is a front view, partly in section, illustrating my improved heating-stove. Fig. 2 is a perspective view of the body portion removed from the base. Fig. 3 is a perspective view of the base.

A is the base of the stove made in the usual manner having legs $a$ and ash pit section $a'$ and ash pit door $a^2$. Mounted on the ash pit section is a plate B secured in the present instance to said section by bolts. Mounted upon studs on the plate B is a supporting frame $B^2$ carrying an open work section $B^3$ and upon this section is a ring $b'$ on which rests the outer drum D of the casing and mounted on this drum is a dome section E.

F is the fire pot and mounted on the fire pot is the inner drum C and mounted on this inner drum is a head $C'$ separating the combustion chamber from the heating chamber. The fire pot, inner drum and head are secured together by bolts G, which pass through the flange $e$ of the head $C'$ and through ears $f$ on the fire pot and on the bolts are nuts $g$.

The inner drum C and outer drum D are secured together by the feed door frame $d^2$ and by the smoke pipe.

Projecting from the fire pot section F are perforated lugs $f'$ which pass through openings in the plate B and cotters $f^2$, or other fastenings are passed through openings in the lugs so as to rigidly fasten the upper section of the stove to the base. The grate in the present instance is supported by lugs from the plate B. By this arrangement the fire pot can be removed with the drum section of the stove by simply detaching the cotters. Thus the grate can be examined and repairs made without dismantling the entire structure; also the drum section and fire pot can be cleansed or repairs made.

It will be understood that other means of fastening the fire pot to the plate B can be used without departing from my invention and my invention can be adapted to other stoves than the one illustrated in the drawings.

I claim as my invention—

1. The combination in a stove, of the body portion, and the base detachably secured one to the other, with a fire pot section carried by the body portion, substantially as described.

2. The combination in a stove, of the base, the plate B thereon, the body portion, the fire pot secured to the body portion and detachably secured to the plate B so that the fire pot can be removed with the body without dismantling the stove, substantially as described.

3. The combination of the base, a plate B thereon, the grate hung to the plate, a body portion, a fire pot secured to the body portion and having lugs $f'$ which extend through openings in the plate B, and cotter or other fastenings adapted to secure the fire pot to the plate, substantially as described.

4. The combination in a stove of the base, the plate B thereon a body portion consisting of inner and outer drums and a head and dome, with a fire pot vertical bolts securing the fire pot to the head and inner drum, and detachable securing devices by which the fire pot is secured to the base, substantially as described.

In testimony whereof I have signed my name to this specification in the presence of two subscribing witnesses.

THOMAS I. RANKIN.

Witnesses:
WILL. A. BARR,
JOSEPH H. KLEIN.